Jan. 20, 1970     I. M. SPIER     3,490,756
TORSION BAR ASSEMBLY AND METHOD FOR MANUFACTURING THE SAME
Filed Jan. 4, 1966     4 Sheets-Sheet 1
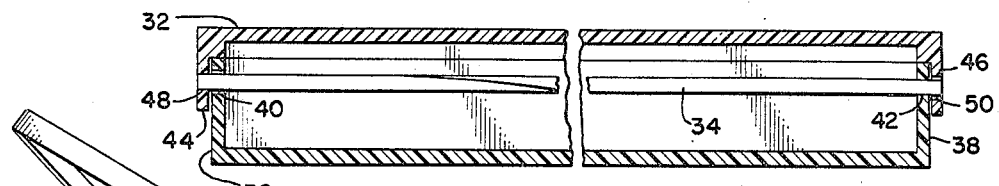
FIG. 2
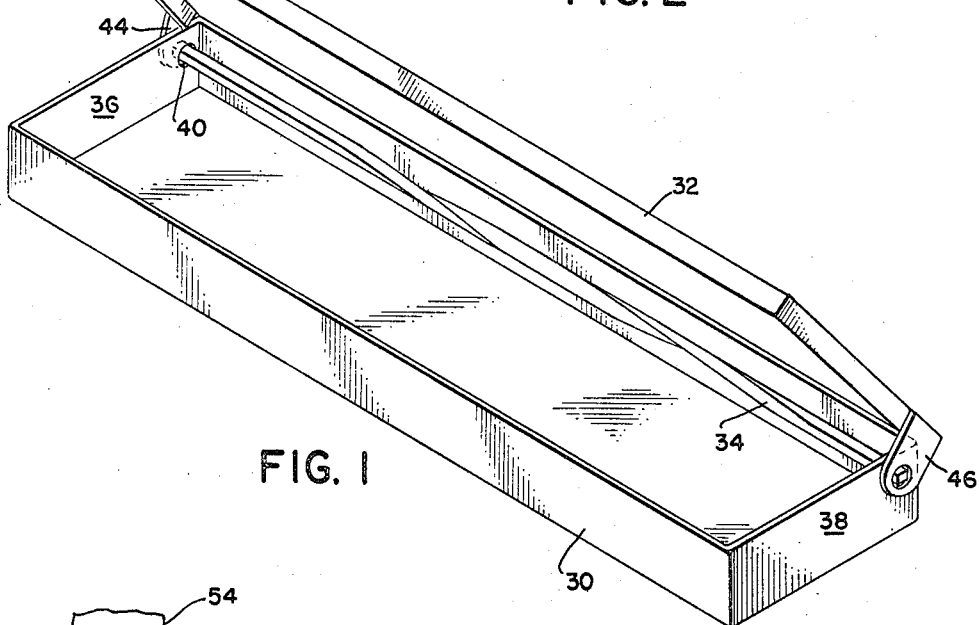
FIG. 1
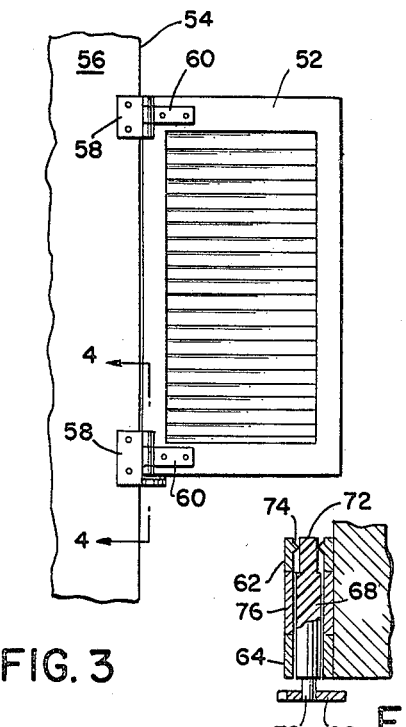
FIG. 3
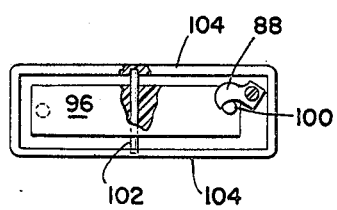
FIG. 4
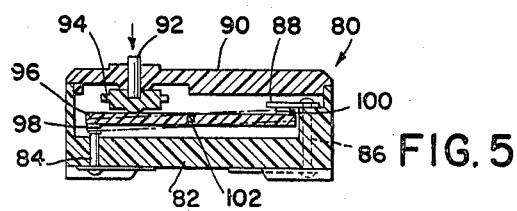
FIG. 5
FIG. 6
INVENTOR.
I. MARTIN SPIER
BY Blum, Moscovitz, Friedman
Blum + Kaplan
ATTORNEYS Jan. 20, 1970     I. M. SPIER     3,490,756
TORSION BAR ASSEMBLY AND METHOD FOR MANUFACTURING THE SAME
Filed Jan. 4, 1966     4 Sheets-Sheet 2

INVENTOR.
I. MARTIN SPIER
BY Blum, Moscovitz, Friedman,
Blum + Kaplan
ATTORNEYS

Jan. 20, 1970     I. M. SPIER     3,490,756
TORSION BAR ASSEMBLY AND METHOD FOR MANUFACTURING THE SAME
Filed Jan. 4, 1966     4 Sheets-Sheet 3
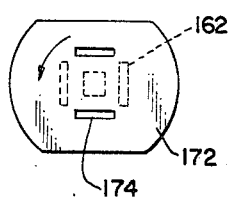
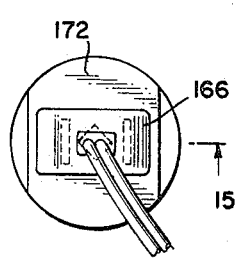
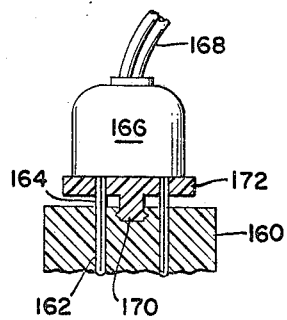
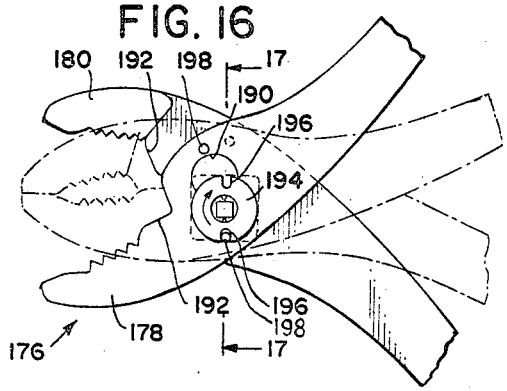
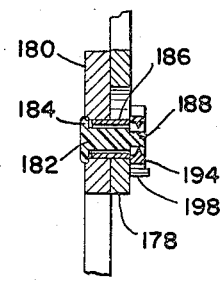
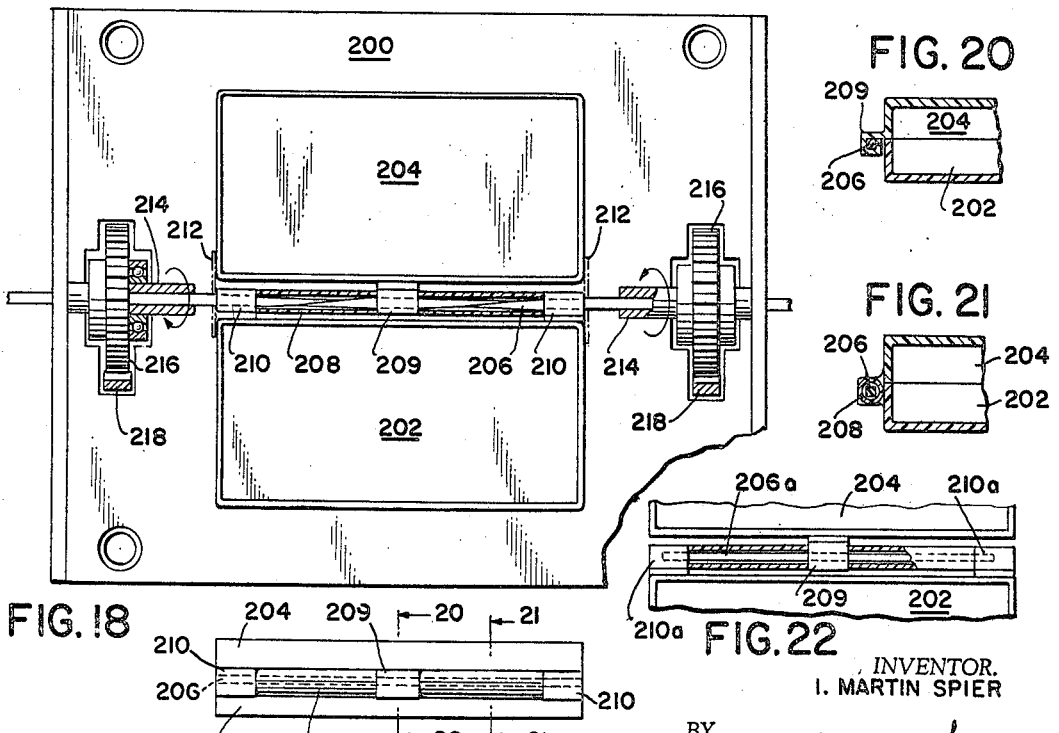
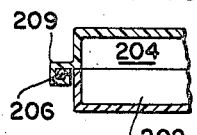
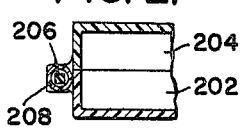
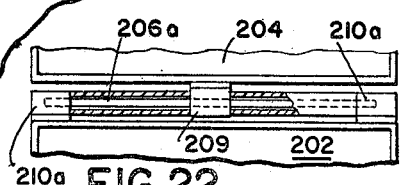
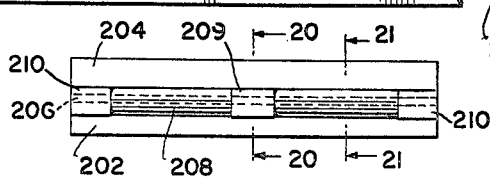
INVENTOR.
I. MARTIN SPIER
BY Blum, Moscovitz, Friedman Blum & Kaplan
ATTORNEYS Jan. 20, 1970   I. M. SPIER   3,490,756
TORSION BAR ASSEMBLY AND METHOD FOR MANUFACTURING THE SAME
Filed Jan. 4, 1966   4 Sheets-Sheet 4
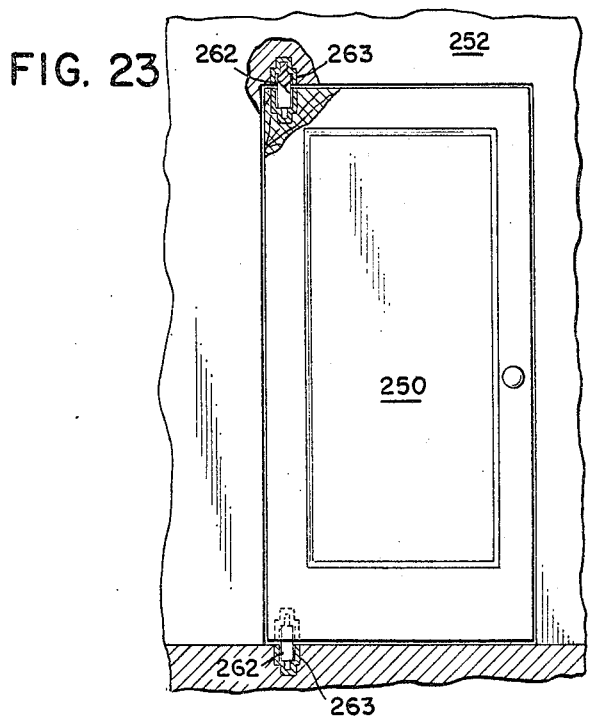
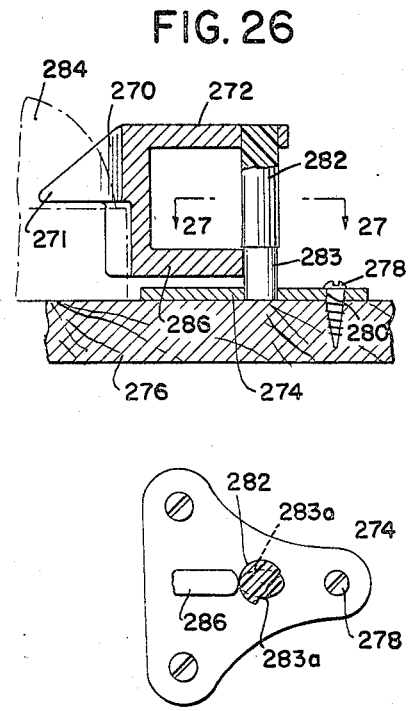
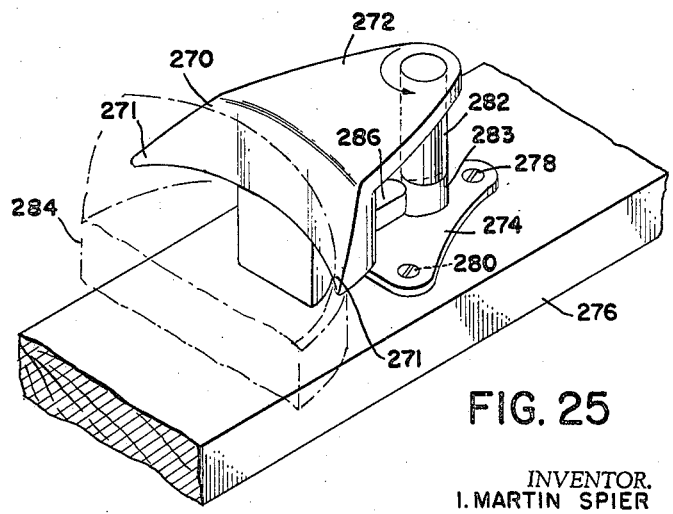
INVENTOR.
I. MARTIN SPIER
BY Blum, Moscovitz, Friedman
Blum, Kaplan
ATTORNEYS United States Patent Office 3,490,756
Patented Jan. 20, 1970

3,490,756
TORSION BAR ASSEMBLY AND METHOD FOR
MANUFACTURING THE SAME
I. Martin Spier, New York, N.Y., assignor to Bacon
Plastic & Metal Products, Inc., New York, N.Y., a corporation of New York
Continuation-in-part of application Ser. No. 364,536,
May 4, 1964. This application Jan. 4, 1966, Ser.
No. 518,728
Int. Cl. F16f 1/48; E05f 1/12; B65d 43/16
U.S. Cl. 267—1                                                                      10 Claims The present invention relates to torsion bar assemblies as well as to a method of manufacturing the same.

This application is a continuation-in-part of copending application Ser. No. 364,536, filed May 4, 1964, now U.S. Patent 3,235,145, and entitled Container Closure Assembly. This latter application is in turn a continuation-in-part of application Ser. No. 133,454, filed Aug. 23, 1961, now U.S. Patent 3,140,020.

The above referred to patent and patent application relate in general to dispensers capable of being open and closed by elements which resiliently urge the dispenser to a given position such as a closed position. Some of these elements include elongated plastic pins which are twisted and operate on a torsion bar principle.

There are many applications other than dispensers which can utilize to great advantage the torsion bar principle particularly where the torsion bar is in the form of a simple elongated plastic element, and it is therefore primarily an object of the present invention to provide structures, which are not necessarily dispensers, but which can use the above torsion bar principle to very great advantage.

In particular, it is an object of the invention to utilize the torsion bar principle in devices where it can be applied with great advantage but also in devices which would normally be considered as not lending themselves to use of the torsion bar principle. At the present time torsion bars are considered as providing very strong resilient forces, inasmuch as one tends to picture an elongated metal bar which must be twisted about its axis in order to provide a torsion bar. Such structures are used, for example, in such heavy applications as automobile suspensions and the like. However, it is one of the discoveries of the present invention that the torsion bar principle can also be utilized to provide a relatively small light spring force, and it is to the wider application of this latter principle as utilized in the application of relatively light spring forces that the present invention is directed.

Thus, it is an object of the invention to provide structures according to which the torsion bar principle can be very advantageously used in such every day devices as containers, doors, toys, tools, and the like.

Moreover, because it is one of the features of the invention to utilize for a torsion bar a plastic elongated member, this member lends itself very well to combination with molded plastic, and accordingly a further object of the invention resides in the provision of an exceedingly efficient and simple method according to which articles may be molded directly with a torsion bar in such a way that the completed article can be removed from the mold without any further operations being required and with the torsion bar already in its proper assembled condition.

Thus, with the present invention the assembly, irrespective of the specific nature thereof, will include a pair of means at least one of which is turnable relative to the other about a given axis, and a torsion bar extends along this latter axis with the pair of means fixed thereto at locations spaced longitudinally along the torsion bar, this torsion bar having an intial condition where it tends to maintain the one turnable means at a given initial position relative to the other means so that when this one turnable means is displaced from its initial position the torsion bar will be further stressed so as to automatically return the displaced means to its initial position when the forces acting on the displaced means to displace the latter from its initial position and to maintain it displaced from its initial position are released.

Furthermore, with the invention the torsion bar can be directly situated in a mold in which plastic is to be molded to form a given article and in accordance with the method of the present invention before the molten plastic which engages the torsion bar has set, the torsion bar is twisted so that the plastic sets on the twisted torsion bar to provide the finished article with a torsion bar directly molded into the finished article and provided with the required initial stress.

The invention is illustrated by way of example in the accompanying drawings which form part of the application and in which:

FIG. 1 is a perpsective illustration of a container which includes features of the invention;

FIG. 2 is a longitudinal section of the structure of FIG. 1 taken in a plane which includes the torsion bar, and the structure is shown in FIG. 2 in the closed position while in FIG. 1 the structure is shown in an open position;

FIG. 3 is an elevation of a swinging door assembly which includes the structure of the invention;

FIG. 4 is a transverse section taken along line 4—4 of FIG. 3 in the direction of the arrows and showing the structure on a scale which is enlarged compared to the scale of FIG. 3;

FIG. 5 is a longitudinal sectional elevation of a switch assembly which includes features of the present invention;

FIG. 6 is a partly sectional top plan view of the switch assembly of FIG. 5 with the cover removed;

FIG. 13 is an elevation of a safety cover for an electrical wall outlet;

FIG. 14 shows the structure of FIG. 13 when a plug has been introduced into the receptacle of the wall outlet;

FIG. 15 is a fragmentary section taken along line 15—15 of FIG. 14 in the direction of the arrows;

FIG. 16 is a fragmentary side elevation of a combined plier and wire-cutter structure which uses the present invention;

FIG. 17 is a transverse section taken along line 17—17 of FIG. 16 in the direction of the arrows;

FIG. 18 is a top plan view of the female part of a mold assembly used for the injection molding of plastic articles, FIG. 18 also showing the resulting molded article before it removal from the mold;

FIG. 19 is an elevation of the hinged connection between components of the molded article derived from the structure of FIG. 18;

FIG. 20 is a transverse fragmentary sectional view taken along line 20—20 of FIG. 19 in the direction of the arrows;

FIG. 21 is a transverse fragmentary section of the structure of FIG. 19 taken along line 21—21 of FIG. 19 in the direction of the arrows;

FIG. 22 is a partly sectional elevation fragmentarily illustrating a molded article slightly modified from that of FIGS: 18–21;

FIG. 23 is a partly schematic and partly sectional elevation of a door and door-supporting structure which incorporate features of the present invention;

FIG. 24 is a sectional elevation on an enlarged scale of one of the hinge connections of FIG. 23;

FIG. 25 is an isometric view of another embodiment of the invention in the form of a ski toe plate assembly;

FIG. 26 is a cross section of the assembly; and

FIG. 27 is a section in line 27—27 of FIG. 26.

Figure 7:
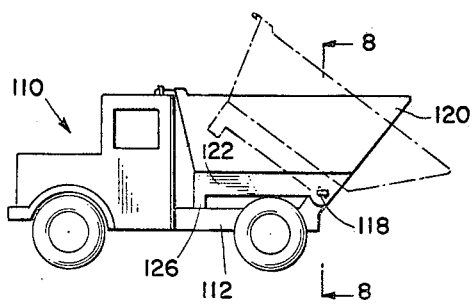
FIG. 7 is a schematic side elevation of a toy dump truck which incorporates features of the invention.

Referring now to FIGS. 1 and 2, it will be seen that the open-top container 30 together with its cover 32 form a pair of means one of which is turnable with respect to the other about a given axis. Thus, the cover 32 is turnable with respect to the container 30 about a predetermined axis, as will be apparent from the description below.

A torsion bar 34 extends along the turning axis between the pair of means 30 and 32. This torsion bar is an elongated solid body of non-circular cross section and is preferably made of a plastic such as polypropylene.

It will be seen that the open-top container 30 has a pair of opposed end walls 36 and 38. These end walls are respectively formed with openings 40 and 42 which are located along a common axis. While the torsion bar 34 extends with clearance through the opening 40 so as to be freely turnable with respect to the end wall 36, the opening 42 has such a small size with respect to the torsion bar 34 and conforms so closely to the cross-sectional configuration thereof that the torsion bar 34 is in fact fixed to the wall 38 while passing through the opening 42 thereof, so that at the wall 38 of the container 30 there can be no relative turning between the torsion bar 34 and the wall 38.

The cover 32 has a pair of depending ears 44 and 46 respectively formed with openings 48 and 50 which are also located along the common axis of the openings 40 and 42. The opening 48 adjoins the opening 40 and has the same size and shape as the opening 42 so that the ear 44 is fixed to the torsion bar 34. On the other hand the opening 50 has the same size and shape as the opening 40 so that the ear 46 is freely turnable with respect to the torsion bar.

Thus, with this construction when the cover 32 is displaced from an initial position where it closes the container 30 upwardly from the latter, by being turned about the axis torsion bar 34, the torsion bar cannot turn at the end wall 38 and at the ear 44 and will thus become twisted between the ear 44 and the end wall 38, as clearly indicated in FIG. 1. On the other hand, the torsion bar can freely turn with respect to the wall 36 and the ear 46 so that the torsion bar is guided by the opening 40 while the ear 46 is guided by the torsion bar which has its portion slidably engaged by the ear 46 in the opening 50 thereof.

Assuming that initially the torsion bar 34 has a prestress or initial stress sufficient to lightly maintain the cover 32 in its closed position, then when the forces acting on the cover 32, such as that exerted by the hand of the user, to displace the cover 32 away from its initial closing position and to maintain it away from its closing position are released, the torsion bar 34 will return the cover 32 automatically to its initial closed position, and in this way the torsion bar cooperates with the pair of means 30 and 32 for maintaining the turnable means 32 yieldably and automatically at an initial position with respect to the means 30 when other forces do not displace the means 32 away from its initial position in opposition to the torsion bar 34.

An advantage of this embodiment is the provision of the relatively long tension pin, with proportionate minimum change in length when twisted.

FIGS 3 and 4 illustrate how the torsion bar principle is applied to a swinging door assembly. In this case a swinging door 52 is swingably mounted along the edge 54 of a doorway formed in a wall 56 with structure of the present invention.

This latter structure includes the stationary hinge components 58 situated adjacent the upper and lower ends of the door and the movable hinge components 60 which are fixed to the swinging door 52. The stationary components 58 each form one of the pair of means of the assembly of the invention. They are fixed as by any suitable screws to the wall 56 or a door frame carried thereby, and each stationary element 58 has a pair of axially displaced sleeve portions 62 and 64 as well as a supporting ear 66. These portions 62, 64 and 66 project from that part of the component 58 which is fixed directly to the wall 56. The torsion bar 68 which is made of a resilient yieldable plastic such as polypropylene has a bottom non-circular end 70 situated in a mating non-circular opening of the supporting ear 66. It also has a top end 72 of non-circular cross section which is fixed to the sleeve 62 which has inwardly directed projections 74 engaging the opposed flat surfaces of the part 72 of the torsion bar 68 so as to prevent turning of the latter with respect to the upper sleeve portion 62 of each hinge component 58.

The turnable hinge component 60 of each hinge assembly has a sleeve portion 76 which fits between the sleeve portions 62 and 64 and which has an interior bore of non-circular cross section mating with the non-circular cross section of the part of the torsion bar 68 which extends between its ends 70 and 72. Thus, the element 60 forms a means turnable with respect to the element 58 and the element 60 is fixed to the torsion bar 68 at a portion thereof which is axially spaced from the portions 70 and 72 which are fixed to the means 58, so that with this construction the torsion bar will initially maintain the door 52 at a given position where the elements 60 will be in substantially the same plane as the elements 58. However, the swinging door 52 can be swung in either direction from its rest position resulting in twisting of the torsion bar 68 in a manner which will cause it to return the parts to their initial position.

FIGS. 5 and 6 illustrate how the principles of the invention are applied to a switch assembly 80. This assembly includes a lower housing 82 made of any suitable plastic or other non-conductive material. This housing carries the electrically conductive connector elements 84 and 86 to which suitable leads can be connected. The upper end of element 84 forms one contact which is situated in the interior of the housing 82, and the upper end of the element 86 carries a contact 88 which is also accessible in the hollow interior of the housing 82.

The housing 82 is covered by a non-conductive cover 90, which also may conveniently be made of a plastic material and which can be removably connected to the switch housing 82 in any suitable way. The cover 90 is formed with a bore through which a manually operable plunger 92 extends, or the plunger 92 can be automatically actuated from any suitable cam, solenoid, or the like. This plunger 92 acts on an electrically non-conductive motion-transmitting element 94 situated in the interior of the housing 82. The element 94 is situated directly over a portion of an elongated substantially rigid switch member 96 which may or may not be electrically conductive. Assuming that it is not electrically conductive, then the switch element 96 carries contacts 98 and 100 respectively displaceable into engagement with the contacts 84 and 88 when the switch element 96 is displaced in a counterclockwise direction, as viewed in FIG. 5, about an axis passing through the center of the switch element 96 normal to the plane of FIG. 5. In this case suitable unillustrated leads are connected with the contacts 98 and 100 so that circuits will be closed by engagement of these contacts with the elements 84 and 86.

In accordance with the invention the switch element 96 is formed with a transverse bore of non-circular cross section passing therethrough and receiving with a fairly tight fit a torsion bar 102 of non-circular cross section mating tne cross section of the bore of the switch element 96. This torsion bar 102 is made of a suitable plastic such as polypropylene, so that it is resilient and tends to assume a predetermined initial condition. The ends of the torsion bar 102 are received in openings formed in the walls 104 of the housing 82, and these openings are of a cross section mating with that of the bar 102 so that these openings are non-circular and tightly receive the ends of the torsion bar 102.

Thus, with this construction the housing 82 forms one means which is fixed to the torsion bar 102 while the switch member 96 forms another means which is fixed to the torsion bar 102 and which is turnable relative to the housing 82 from an initial position where the left end of the switch element 96 urges the motion transmitting element 94 and the plunger 92 upwardly. When the operator displaces the plunger 92 downwardly, as indicated by the arrow in FIG. 5, the turning of the switch element 96 takes place in opposition to the torsion bar 102 so that when the plunger 92 is released the parts will automatically be returned to the position where the switch is open.

Figure 8:
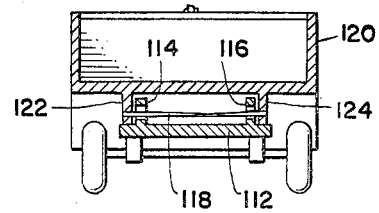
FIG. 8 is a transverse section of the toy of FIG. 7 taken in a plane which includes the torsion bar of the invention, FIG. 8 being taken along line 8—8 of FIG. 7 in the direction of the arrows.

FIGS. 7 and 8 illustrate how the invention is applied to a toy such as a dump truck 110. This toy dump truck has a chassis 112 provided with a pair of ears 114 and 116 (FIG. 8). An elongated torsion bar 118 made of a plastic such as polypropylene and having a non-circular cross section passes through openings in the ears 114 and 116. This torsion bar passes with clearance through the opening in the ear 116 so that it is freely turnable in the opening of the ear 116, while the opening of the ear 114 closely matches the cross section of the torsion bar so that the latter is tightly held in the opening of the ear 114.

A load carrier 120 which has an open top is mounted on the chassis 112 and has the initial solid-line position shown in FIG. 7 where this load carrier 120 is directed upwardly. At its underside the load carrier has depending side portions 122 and 124 respectively formed with openings situated along the axis of the torsion bar and receiving end portions of the latter, as indicated in FIG. 8. The opening of the depending portion 122 receives the torsion bar with clearance so that this portion 122 is guided by the left end of the torsion bar 118, as viewed in FIG. 8, while the opening of the depending portion 124 closely matches the cross section of the torsion bar 118 to receive the latter with a tight fit thus fixing the right end of the torsion bar 118, as viewed in FIG. 8, to the depending portion 124 of the load carrier 120. Thus, this construction will operate in much the same way as the embodiment of FIGS. 1 and 2. In the initial position of the parts the torsion bar 118 is prestressed so as to urge the stop member 126 of the load carrier into engagement with the chassis 112. However, when the operator tilts the load carrier 120 in opposition to the force of the torsion bar 118 to the dot-dash line position shown in FIG. 7, the torsion bar will be further stressed so that after the load empties from the carrier 120 and the operator releases the load carrier 120 the torsion bar will automatically return it to the solid-line initial position shown in FIG. 7 in which the load carrier will be yieldably and resiliently maintained until it is again displaced to the tilted position in opposition to the torsion bar.

Figure 9:
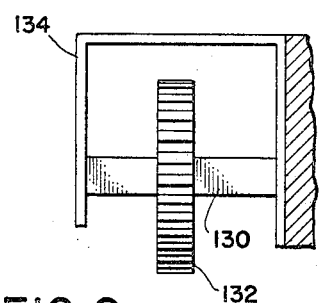
FIG. 9 is an elevation of a pinion which forms part of a rack-and-pinion assembly, this pinion being shown in FIG. 9 supported by a torsion bar structure of the invention.
Figure 10:
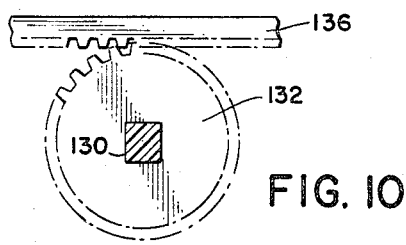
FIG. 10 is a transverse section of the torsion bar of FIG. 9 with the pinion thereon and fragmentarily illustrating a rack meshing with the pinion.

As is illustrated in FIGS. 9 and 10, it is also possible in accordance with the invention to apply the torsion bar principle to a mechanical transmission which can be automatically maintained through the resiliency of the torsion bar at a given initial position. In this case the torsion bar 130, which has the square cross section indicated in FIG. 10, extends through a bore of the pinion 132. This bore is also of a square cross section so that the torsion bar 130 is fixed to the pinion 132 and cannot turn relative thereto. The ends of the torsion bar 130 are, however, fixed to a stationary mounting structure such as the bracket 134 indicated in FIG. 9. Thus, with this construction the bracket 134 will form with the pinion 132 a pair of means with the means 132 being turnable about the axis of the torsion bar with respect to the stationary means 134 while stressing the torsion bar 130 so that it will return the means 132 to a predetermined initial position.

As indicated in FIG. 10 the pinion 132 meshes with a rack 136 which is longitudinally shiftable and thus the rack 136 will be maintained at a given longitudinal position with this construction.

Figure 11:
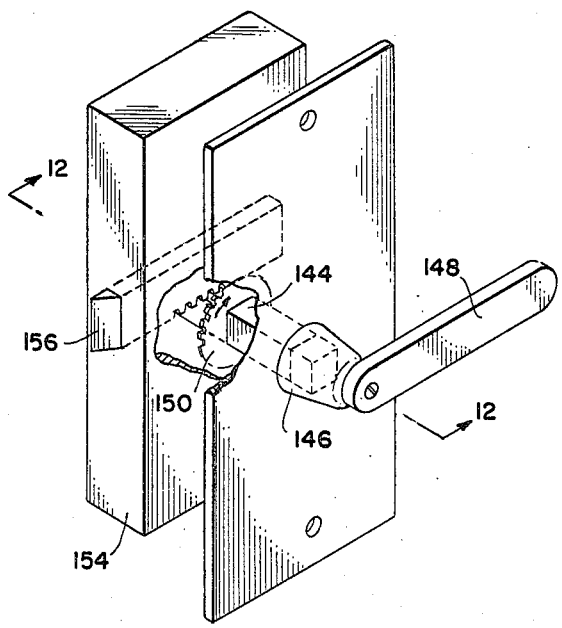
FIG. 11 shows how the structure of FIGS. 9 and 10 may be incorporated into a door latch assembly.
Figure 12:
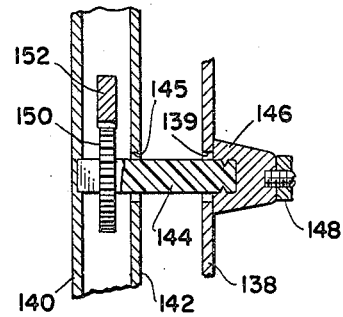
FIG. 12 is a section taken along line 12—12 of FIG. 11 in the direction of the arrows and showing the latch structure in a transverse view.

FIGS. 11 and 12 show how the transmission of FIGS. 9 and 10 can be utilized in a door latch. The door is not illustrated in FIGS. 11 and 12. A portion of the wall of the door is situated between the plate 138 and the pair of spaced plates 140 and 142 which are maintained spaced from each other by any suitable spacer elements which are not illustrated. The plates 140 and 142 form an assembly which is situated in a suitable recess formed in the door while the plate 138 can be situated at an exterior surface of the door, and the torsion bar 144 can pass turnably through a bore which is formed in the door providing communication between the recess which receives the plates 140 and 142 and the surface against which the plate 138 is located. A rotary fitting 146 is fixed to the right free end of the torsion bar 144, and any suitable handle 148 may be fixed to the fitting 146. The other end of the torsion bar 144 is fixed to the plate 140, and the torsion bar extends freely through respective openings 145 and 139 of the plates 142 and 138. In the space between the plates 140 and 142 the torsion bar is fixed to a pinion 150 which corresponds to the pinion 132, and this pinion 150 meshes with a rack 152 guided for longitudinal movement by guiding elements situated between and carried by the plates 140 and 142. These guiding elements may include structure such as the end wall 154 situated at an edge of the door and formed with a suitable opening through which the rack 152 is freely slidable. The end 156 of the rack which projects beyond the end wall 154 is of a wedge-shaped configuration so as to form a latch capable of snapping into a suitable opening formed in the door frame, so that in this way the door will automatically be locked when it is shut. However, the operator need only turn the handle 148 so as to twist the torsion bar and thus turn the pinion 150 in a clockwise direction, as viewed in FIG. 11, so as to retract the latch 156 and open the door. When the torsion bar 144 is twisted in this way its left end, as viewed in FIG. 12, does not turn since it is fixed to the plate 140, and thus the torsion bar is twisted so that it will return the parts to their initial position when the handle 148 is released by the operator.

FIGS. 13–15 illustrate how the invention is applied to an electrical wall outlet. This wall outlet includes a stationary receptatcle 160 formed with the prong-receiving openings 162. When these openings receive the prongs 164 of a plug 166 connected to a suitable electrically conductive cable 168, any electrical device connected to the cable 168 will receive current, as is well known.

In accordance with the invention the receptacle 160 or the wall in which it is mounted fixedly carries one end of a torsion bar 170 whose opposite end is fixed to a safety plate 172, and in the illustrated example this plate is integral with the torsion bar 170. The plate 172 is formed with a pair of openings 174 which will become aligned with the openings 162 of the receptacle when the plate 172 is turned through an angle of 90° from the position thereof shown in FIG. 13. The operator will introduce the prongs 164 through the opening 174 and turn the plate 172 in opposition to the force of the torsion bar 170 through 90° so that the prongs will become aligned with the openings 162 and now the operator will continue to move the plug 166 until it assumes the position shown in FIG. 15. In this way a child will not have access to the receptacle openings 162 when there is no plug received thereby and at the same time any person can turn the safety plate 172 so as to utilize the wall outlet. The plate 172 is shown in its position where its openings 174 are aligned with the openings 162 in FIG. 14. As soon as the operator removes the plug 166 the torsion bar 170 will return the safety plate 172 into the position of FIG. 13.

Thus, here again the receptacle or wall 160 and the safety plate 172 form a pair of means one of which is turnable relative to the other about the axis along which the torsion bar 170 extends, and this torsion bar is fixed to this pair of means so as to yieldably maintain them in a predetermined initial position one relative to the other.

FIGS. 16 and 17 illustrate the invention as applied to combined pliers and wire-cutters which can be constructed in accordance with the invention as illustrated in FIGS. 16 and 17.

This tool 176 has a pair of jaws 178 and 180. The torsion bar 182 extends through aligned coaxial openings of the jaws 178 and 180, and at its left end, as viewed in FIG. 17, the torsion bar 182 has a non-circular head 184 of square cross section, for example, received in a recess of jaw 180 which is of a mating configuration, so that the head 184 cannot turn relative to the jaw 180.

A metallic sleeve 186 extends slidably through the aligned openings of the jaws 178 and 180 and is fixed at its right end, as viewed in FIG. 17, to the end 188 of the torsion bar 182, so that while the sleeve 186 is turnable in the bore of the jaw 180, slidably engaging the latter, it is not axially movable with respect to the torsion bar 182 and is firmly fixed thereto at its end 188. The aligned opening of the jaw 178 which receives both the torsion bar and the sleeve 186 surrounding the latter is part of an elongated slot 190 formed in the jaw 178 and enabling the latter to be shifted relative to the jaw 180 to positions where the sleeve 186 engages one or the other of the ends of the elongated slot 190. When the sleeve 186 engages one of the slot ends the jaws will cooperate as plier jaws for gripping any desired element, while when the sleeve 186 engages the other end of the slot 190 the portions 192 of the jaws will cooperate as wire cutters, as is well known.

The sleeve 186 is formed distant from the jaw 180 with an outwardly directed flange 194, and the jaw 178 is confined between this flange and the jaw 180. This flange 194 is formed with a pair of opposed notches 196, and the jaw 178 carries a pair of pins 198 which can be selectively displaced into the notches 196, respectively. Thus, in the position of the parts shown in FIG. 16 it is the lower pin 198 which is in the lower slot 196, and thus the jaws will be turned in opposition to the force of the torsion bar 182 when they are displaced with respect to each other in the solid-line position where they act as plier jaws. On the other hand, it is possible to shift the jaw 178 downwardly so that the upper end of the slot 190, as viewed in FIG. 16, engages the sleeve 186, and now the upper pin 198 will be received in the upper notch 196, so that when the tool 176 acts as a wire-cutter, for example, the force of the torsion bar 182 will also act through the sleeve 186 on the jaws to tend to maintain them at a predetermined initial position one relative to the other.

Thus, in this case also the pair of jaws form a pair of means at least one of which is turnable relative to the other about an axis along which the torsion bar extends, and of course this sorsion bar is fixed to the pair of jaws so as to tend to maintain them at a predetermined initial position relative to each other.

The structure of this embodiment is also applicable to shears and the like, in which case the slot 190 need not be elongated, so that the sleeve 186 cannot be transversely displaced, and the two blades of the shears simply pivot relative to each other.

The principle of the sleeve 186, with its great addition to the strength of the assembly, can also be applied to the pivoted handbag frames, luggage parts such as handles and many other articles.

FIG. 18 shows the female part of an injection mold assembly in which the method of the invention can be practiced. The injection mold part 200 shown in FIG. 18 is formed with mold cavities in which a container 202 and a cover 204 are respectively molded.

Torsion bar holding assemblies are located beyond the ends of the cavities, as shown in FIG. 18. Specifically, each of these assemblies comprises a collet 214 of non-circular cross section fixed to and extending through rotary pinion 216 which is supported for rotary movement together with the sleeve 214 by any suitable bearing structure. A rack 218 meshes with each pinion 216. An elongated rod 206 of non-circular cross section mating with that of the collet 214 can be fed from an extrusion source or other source (not shown) continuously through the two collets and hence across the molds. The collets can be turned in the direction of the arrows, so as to twist the bar 206. It will be understood that the bar 206 serves as the blank for the torsion bar in accordance with the invention and is made of polypropylene or other suitable material in accordance with the invention, as previously described. Thus, prior to closing the mold, the bar 206 is fed between the collets so as to lie between the two principal mold recesses. The mold recesses are shaped, and the cooperating male part of the mold is shaped, so that in the molding the walls of the container 202 and cover 204 are formed in addition to the end hinges 210 attached to the container 202, the intermediate hinge fixed to the cover 204 and the sleeves 208 between the hinges and surrounding the bar 206. Prior to the molding, the bar 212 has been twisted, by manipulation of the collets, so as to impart a twist to the bar portion 206 between the end hinges 210, as shown. In the molding, the bar 206 remains turnable within the sleeves 208 but is fixed to the hinges, the direction of twist being such as to tend to close the cover upon the container. It will be apparent that the male mold part cooperates with the recess 209, according to well known principles (not shown) to produce the desired end product. That is, locking pins can be introduced into the mold so as to prevent the material from forming upon the bar 206 between the end hinges, so as to form the sleeves 208.

When the plastic has set, the structure is fully completed and can be removed from the mold, with the aid of the usual knockout pins (not shown). Associated with the knockout pins can be knives 212, shown diagrammatically, which cut the bar 212 at the outer ends of the outer hinges 210, leaving, of course, the bar 206. The excess stock can then be removed and the further stock 212 fed into position for the next molding operation.

Thus, as can be seen from the drawing, the cover is molded with the container with the hinges at the same time formed about the torsion bar 206. As shown in FIG. 20, the hinge closely and non-rotatably engages the torsion bar. As shown in FIG. 21, the torsion bar is freely turnable within the protective sleeve 228.

FIG. 22 illustrates a modification wherein instead of a continuous length of bar stock, a bar 206a which is precut is placed in the mold cavity, this being slightly shorter than the overall length of the container so that the end hinges are closed about the ends of the bar, as clearly shown in the drawing. While this method does not lend itself quite as much to automatic control, as does the method of FIG. 18, less apparatus is required in accordance with the method of FIG. 22. Additionally, the torsion bar of FIG. 22 is shown in untwisted condition, corresponding to a normally open condition of the cover relative to the container. It is apparent that when the cover is closed upon the container, the bar is twisted and thereby returns the cover to the normal open position upon release of the cover.

Referring to FIGS. 23 and 24, there is illustrated therein a wall 252 of a room, this wall being provided with an opening to receive the door 250. The wall 252 is formed just above the upper left hand corner of the door 250, as viewed in FIG. 23, with an opening which receives a cup-shaped fitting 263 of stepped configuration having a non-circular end portion 256 of a smaller diameter than the remainder of the fitting 263 (FIG. 24), and an identical fitting 263 is situated in the floor just beneath the lower left hand corner of the door 250 of FIG. 23, and these fittings 263 are coaxially arranged. A pair of fittings 254 are respectively carried directly by the door 250 coaxially arranged with respect to the fittings 263, and one of these fittings 254 is indicated in FIG. 24. It will be noted that this fitting also has a reduced end 258 of non-circular section.

The torsion bars 262 are situated in the region of the upper and lower corners of the door 250, and these torsion bars respectively have the non-circular ends 260 of reduced section received in the non-circular ends 256, 258 of each pair of aligned fittings 263 and 254, and it is to be noted that the torsion bar 262 also is of non-circular cross section between ends 260 where it is spaced inwardly from the fittings as shown most clearly in FIG. 24.

With the embodiment of FIGS. 23 and 24 as well as with all other embodiments of the invention the torsion bar is not only made of a resilient plastic material, such as polypropylene, but in addition it is of a non-circular cross section throughout its entire length with any one cross section of the torsion bar having a configuration identical with that of any other cross section thereof and oriented in the same way, although the areas of the different cross sections may be different as in the case where the torsion bar has reduced ends such as the reduced ends 260 of FIG. 24.

With reference now to FIGS. 25, 26 and 27 these views illustrate how the invention can be applied to a toe piece for a ski. It has become common to provide safety bindings for skis to enable the ski boot to become free of the ski under emergency conditions. Thus, apart from releasable heel bindings, it has been common to provide a toe piece which is mounted swivelly upon the ski with provision that the toe of the boot is normally securely held, but if the foot should twist under emergency conditions, beyond a certain normal point of movement, the toe piece is actuated so as to permit the toe of the boot to come completely clear of the toe piece. The torsion bar in accordance with this invention has particular applicability to a low cost but highly effective toe piece of this general type.

As shown in FIGS. 25, 26 and 27, the toe piece comprises an arcuate, concave, vertically extending toe plate 270. A further plate 272 is fixed to the upper edge of the toe plate 270 and extends forwardly thereof in horizontal position. A generally triangular base plate 274 is located underneath and opposing the plate 272, forwardly of plate 270, and is fixed to the upper face of the fragmentarily shown ski 276 by means of screws 278 extended through holes 280 in the base plate 274.

The plate 272 is connected to the base plate 274 by means of a vertically extending torsion bar or pin 282, corresponding in material and properties to the torsion bars of the previous embodiments. As shown in the drawing, the vertical toe plate 270 extends to the level of and rests slidably upon the upper face of the ski 276. The drawing shows the toe 284 of the boot resting upon the ski 276 and held against the toe plate 270, in the customary manner. In other words, the boot is held frictionally between the toe plate and the heel binding, the heel binding being of any suitable type and accordingly not shown. The torsion bar or pin 282 is adapted to be twisted about its axis so as to permit turning of the toe piece about the axis of pin 282 relative to the ski. Under normal conditions of use, the pin 282 is sufficiently rigid so that the toe piece does not twist. However, under conditions of abnormal radial stress, as upon an abnormal tendency of the boot toe to twist relative to the ski, the force of the boot upon either of the side wings 271 of the toe plate 270 causes the toe piece to turn and thereby to twist the pin about its axis. It will be apparent that at a certain point, the boot toe will pass the limit of the toe plate 270 and fall free thereof, thereby releasing the toe of the boot from the toe piece.

Further in accordance with the invention, means are provided both to rigidify the assembly under normal conditions of use, and at the same time, to provide a margin of movement of the pin, in a direction transverse to its axis, so as to facilitate the removal of the boot toe under abnormal conditions. Specifically, a vertical flange or bar 286 is fixed to the center of the vertical toe plate 270 and extends forwardly longitudinally thereof. It will be apparent, of course, that the plates 270 and 272, together with the bar 286, can be integrally formed of any suitable rigid cast metal or plastic, or can be fixedly secured together by any other suitable means. In accordance with the invention, the front vertical edge of the bar 286 bears frictionally slidably against a lower pin portion 283. This pin portion 283 has a cam shape, and the bar 286 may be considered to be a cam follower. The cam portion 283 of the pin may be generally oval in cross section, or in other words, with cutaway sides 283a which can be considered as side recesses in the overall pin 282. It will be apparent that the pin 282 may be fixedly received at its upper and lower ends respectively in the plate 272 and the further plate 274, by any suitable means (not shown). It is within the scope of the invention for the pin 282 to be molded integrally with the base plate 274, in which case the entire assembly can be made of two parts with any suitable adherence of the pin 282 to the plate 272.

In use, the bar 286 normally abuts the front portion of the pin portion 283. As a result, there is substantially no bending of the pin 282 as the result of forward force of the boot toe 284 upon the toe piece, because of the fact that the bar 286 bears against the pin at a point very close to the point of attachment of the pin to the base plate 274. When, under abnormal conditions, the boot toe 284 twists to one side, against one of the wings 271, the plate 272 turns about the axis of pin 282, and pin 282 is twisted. The bottom portion 283 is twisted the least, with most of the twisting taking place in the upper portion of the pin. As a result, the bar 286 shifts relative to the pin 282 and now begins to abut one of the cutaway side portions 283a. As a result, the forward component of the force of the boot upon the toe piece pushes the rear edge of the bar 286 against the cutaway pin portion 283, with corresponding flexing of the pin 282 in the direction transverse to its axis. The resulting slight forward movement of the toe plate 270 allows more clearance for the foot and also reduces the amount of force necessary for further turning of the toe piece, thereby facilitating the whole process of swinging the boot and toe piece to the point at which the boot toe is clear of the wing 271 and thereby released from the toe piece. The rearward movement of the toe piece will also facilitate upward movement of the boot toe relative to the ski, because as the pin 282 is twisted and the cam follower 286 rides along the edge portion 283a, the toe piece will be cantered, or in other words, twisted so as to tend to raise slightly the side of the plate 270 against which the toe of the boot is exerting the excess of force. Accordingly, the boot toe will tend to be lifted upwardly as well as shifted to the side, thereby facilitating the separation of the boot from the toe piece.

What is claimed is:

1. An assembly which is capable of automatically assuming a given condition, comprising a pair of means at least one of which is turnable relative to the other about a given axis, and a torsion bar extending along said axis, said pair of means respectively being fixed to said torsion bar at areas thereof which are longitudinally spaced from each other along said torsion bar, and said torsion bar resiliently and yieldably maintaining at least said one turnable means at a given initial position relative to the other of said pair of means, and said torsion bar yielding when said one means is turned about said axis relative to said other means away from said initial position and automatically returning said one means to said initial position when said one means ceases to be acted upon by any forces which displace it from or maintain it displaced from said initial position, said torsion bar being non-metallic and having throughout its entire length a non-circular cross section with any one cross section having a configuration identical with and oriented in the same way as any other cross section at least for a substantial portion of its linear dimension.

2. An assembly as recited in claim 1 and wherein said torsion bar is made of polypropylene.

3. An assembly as recited in claim 1 and wherein at least one of said means is molded directly onto said torsion bar.

4. An assembly as recited in claim 1 and wherein said other means is a stationary switch housing and said one means is a turnable switch member carried by said torsion bar and fixed thereto, said torsion bar also being fixed to said switch housing and said housing carrying electrical contacts respectively engaged by contacts carried by said switch member when the latter is displaced from said initial position, so that said torsion bar tends to yieldably maintain said switch member in a position where the contacts carried by said one means are out of engagement with the contacts carried by said housing.

5. An assembly as recited in claim 1 and wherein said other means is a toy dump truck chassis and said one means is a load-carrier of the toy, said torsion bar being respectively fixed with said load-carrier and chassis for turnably connecting said carrier to said chassis for movement from an initial position where said carrier has a hollow interior directed upwardly and a dumping position where said load carrier assumes a tilted position providing for falling of a load out of the latter by gravity, whereupon when said load carrier is released from said tilted position it will be automatically returned by said torsion bar to said initial position.

6. An assembly as recited in claim 1 and wherein said one turnable means is a rotary pinion, said torsion bar extending through and fixed to said rotary pinion and said other means being formed by a stationary structure fixed to said torsion bar on opposite sides of said pinion, and an elongated rack meshing with said pinion so that when said rack is longitudinally displaced said pinion will turn to stress said torsion bar, so that when said rack is released said pinion and torsion bar will return to said initial position providing for said rack a predetermined initial location.

7. An assembly as recited in claim 6 and wherein said rack forms part of a door latch.

8. An assembly as recited in claim 1 and wherein said pair of means are respectively a pair of combined plier and wire-cutter jaws, said torsion bar being fixed to one of said jaws and extending through the latter and the other of said jaws, a sleeve freely surounding said torsion bar and fixed thereto at a location spaced from the location where said one jaw is fixed to said torsion bar, said sleeve having an outwardly directed flange spaced from said one jaw, and the other of said jaws being confined between said one jaw and said flange and being formed with an elongated slot providing for displacement of said other jaw between positions with respect to said one jaw where said other jaw will cooperate therewith to form either a pair of pliers or a wire cutter, and said flange being formed with a pair of opposed notches at its periphery, said other jaw having a pair of pins respectively received in said notches in said positions of said other jaw, so that turning of said jaws relative to each other either in the position of said jaws where they act as pliers or in the position of said jaws where they act as wire cutters will take place in opposition to said torsion bar which thus seeks to return said jaws to a predetermined initial position irrespective of which of said pins is received in one of said notches.

9. An assembly which is capable of automatically assuming a given condition, comprising a pair of means at least one of which is turnable relative to the other about a given axis, and a torsion bar extending along said axis, said pair of means respectively being fixed to said torsion bar at areas thereof which are longitudinally spaced from each other along said torsion bar, and said torsion bar resiliently and yieldably maintaining at least said one turnable means at a given initial position relative to the other of said pair of means, and said torsion bar yielding when said one means is turned about said axis relative to said other means away from said initial position and automatically returning said one means to said initial position when said one means ceases to be acted upon by any forces which displace it from or maintain it displaced from said initial position, said torsion bar being non-metallic and having throughout its entire length a non-circular cross section with any one cross section having a configuration identical with and oriented in the same way as any other cross section at least for a substantial portion of its linear dimension, said pair of means being respectively plastic container and cover members portions of which are directly molded onto said torsion bar to be fixed thereto.

10. Method of molding a hinged device comprising disposing a resilient, twistable torsion bar in a mold cavity between further mold cavities for first and second members, closing the molding and flowing molding material into the cavities so as to form the first and second members and to form spaced connections between the torsion bar and the respective first and second members.

References Cited

UNITED STATES PATENTS

| | | | |
|---|---|---|---|
| 22,554 | 1/1859 | Gray | 16—75 |
| 2,375,357 | 5/1945 | Friedman | 267—1 X |
| 2,482,920 | 9/1949 | Levi | 220—35 |
| 2,981,970 | 5/1961 | Nayes et al. | 16—182 |
| 3,120,950 | 2/1964 | Hardison. | |
| 3,140,020 | 7/1964 | Spier | 222—517 |
| 3,143,196 | 8/1964 | Gutowski et al. | 49—386 X |
| 3,235,145 | 2/1966 | Spier | 222—478 |
| 2,531,066 | 11/1950 | Lynch. | |

JAMES B. MARBERT, Primary Examiner

U.S. Cl. X.R.

16—75; 46—242; 49—386; 81—417; 200—160; 220—35; 222—478, 517; 292—172